Fig. I
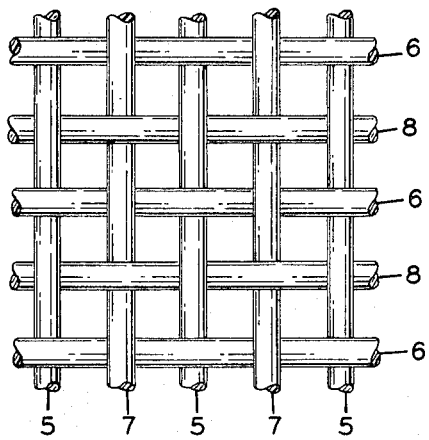
Fig. II
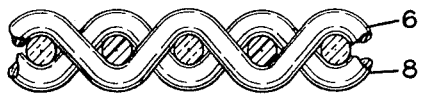
Fig. III
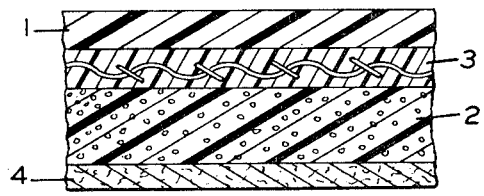
INVENTOR
JAY R. GEORGE United States Patent Office 3,733,239
Patented May 15, 1973

3,733,239
GLASS-ORGANIC FIBER SCRIM FOR FLOORING
Jay R. George, Manheim, Pa., assignor to Armstrong Cork Company, Lancaster, Pa.
Filed Nov. 19, 1971, Ser. No. 200,561
Int. Cl. D03d 13/00, 15/00; B32b 3/26
U.S. Cl. 161—89                                    1 Claim

ABSTRACT OF THE DISCLOSURE

A glass scrim is often placed as the middle layer of a laminated hard surface flooring structure. The scrim is normally in a plain open weave. Herein the strands of glass fiber are alternated with strands of an organic thermoplastic material so that certain glass fiber strands are not placed in an overlying relationship in a certain direction of the weave.

BACKGROUND OF THE INVENTION

Field of the invention

The invention relates to a floor covering and, more particularly, to a reinforced floor covering.

Description of the prior art

U.S. Pat. No. 3,360,422 shows the basic structure of a reinforced cellular floor covering wherein the wearing surface 1 has a backing 4 of a cellular polyvinyl chloride material with an open weave scrim 3 being used to provide a reinforcing medium to the flooring.

U.S. Pat. No. 2,539,301 discloses a structure where a woven glass fabric is made with certain strands in the fabric consisting of a polyvinyl chloride material. The polyvinyl chloride strands are placed in a random pattern and are heat shrinkable to provide the glass fabric with a stretchability feature.

None of the prior art teachings known of disclose the use of alternate strands of glass fiber and polyvinyl chloride to prevent contact between certain glass strands.

SUMMARY OF THE INVENTION

The structure of the flooring herein is provided with at least a wear layer and a backing. Between these two layers there is provided a scrim. If the wear layer is substantially flexible and the backing is relatively nonstretchable, bending of the flooring tends to set up stresses which will cause a popping or separation of certain overlying glass fiber strands. This then provides a separation of the wear layer from the backing layer. This condition is corrected by taking both the warp and fill strands and alternating them between glass fiber material and polyvinyl chloride material. Therefore, no two glass fiber strands will overlap each other in a certain direction. When the composite flooring is laminated together, the glass fiber strands are thus readily held by both the polyvinyl chloride strands and the surrounding layers so that there will be no separation of the glass fiber strands from any other layer of the flooring.

BRIEF DESCRIPTION OF THE DRAWING

FIG. I is a top view of the woven scrim;
FIG. II is an end view of the woven scrim;
FIG. III is a cross-sectional view of the assembled laminated flooring.

DESCRIPTION OF THE PREFERRED EMBODIMENT

Referring to FIG. III, the composite flooring is basically the structure set forth in U.S. Pat. No. 3,360,422. The wear layer 1 is the same as that set forth in the above-mentioned U.S. patent. The scrim layer 3 has been modified as explained below, but it is positioned in the same general manner as that set forth in the above-mentioned patent. In addition, there exists a layer 2 which is disposed between the scrim layer 3 and the backing layer 4. This layer is an intermediate layer which may consist of about .030" of plastisol in a fused or gelled state and is the same as the layer 4 of U.S. Pat. No. 3,360,422. The plastisol is used primarily as a foam cushioning. The backing layer 4 is a conventional felted material such as "Hydrocord," a product of Armstrong Cork Company. An adhesive layer may be used to bond together the intermediate layer 2 and the scrim 3. Layer 2 and scrim 3 can also be laminated together by embedding scrim 3 in the surface of layer 2.

Referring now to FIG. I, there is shown the general weave of the conventional glass fiber scrim. In the invention herein, the strands 5 in the warp direction and the strands 6 in the fill direction are glass fiber material. However, the alternate strands 7 in the warp direction and the alternate strands 8 in the fill direction are a polyvinyl chloride material. Looking at the FIG. II showing, which is the end of the woven scrim, it can be readily seen that strand 6, which is a glass fiber strand, overlies the glass fiber strands 5 but underlies the polyvinyl chloride strands 7. When the scrim of FIG. II is placed in the structure of FIG. III, you will have a situation where the warp strands 5 and 7 are such that the glass fiber warp strand 5 does not pass over a fill glass fiber strand.

When the warp strand of glass fiber passes over the fill strand glass fiber, a situation such as "popping" can occur if the material is bent in the warp direction. That is, under pressure of flexing when the product is flexed in the warp direction during manufacture, there is a yielding of the top strand upward away from the bottom strand. There is an adherence of the two strands of glass fiber together due to the adhesive, but the stress of flexing will break this adhesive bond. Where the fill glass fiber strand passes over the warp glass fiber strand, no popping will occur when flexed in the warp direction. Referring to FIG. II where the fill strand 6 passes over a warp strand of glass fiber, there has never been a problem of popping in processing since stress is applied only in the warp direction. However, where the warp strand, such as 5, passes over the fill strand 6, stresses can cause popping. As was indicated above, popping is a separation of the warp and fill strand which gives you a delamination of the flooring product at that point. By the use of alternate rows of an organic thermoplastic material such as PVC in both the warp and fill direction, it is possible to eliminate the situation where the warp glass fiber strand will pass over a fill glass fiber strand. The warp glass fiber strand is made to pass over a polyvinyl chloride fill strand. This will eliminate the problem of popping when there is a flexing of the flooring material in the warp direction. A particular polyvinyl chloride material in strand form which has been found particularly serviceable in the invention herein is a twisted polyvinyl chloride yarn of 30 d. strands with total yarn denier of approximately 1,350 d.

What is claimed is:

1. A cushion type of floor covering which maintains its dimensional stability and resists delamination comprising a flexible wearing surface and a flexible cushioning backing layer, therebetween there is provided a scrim layer which is a plain open weave fabric, said fabric having the strands extending in a warp direction and a fill direction, the strands of the fabric in both the warp direction and the fill direction being alternately rows of glass fiber and polyvinyl chloride so positioned that when the warp strand of glass fiber passes over a fill strand, said fill strand will be of polyvinyl chloride.

References Cited

UNITED STATES PATENTS

| 2,266,631 | 12/1941 | Francis, Jr. | 28—73 |
| 2,539,301 | 11/1951 | Foster | 28—73 |
| 3,036,602 | 5/1962 | Meyer et al. | 139—420 R |
| 3,360,422 | 12/1967 | Desch | 161—89 |

ROBERT F. BURNETT, Primary Examiner

S. S. SILVERMAN, Assistant Examiner

U.S. Cl. X.R.

139—420 R; 161—90, 92, 93, 95, 161